United States Patent
Schindler et al.

(10) Patent No.: US 8,477,317 B2
(45) Date of Patent: Jul. 2, 2013

(54) POSITION MEASURING ARRANGEMENT

(75) Inventors: Florian Schindler, Traunstein (DE); Robert Kraus, Trostberg (DE); Joel Heersink, Traunstein (DE); Michael Stepputat, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 418 days.

(21) Appl. No.: 12/804,735

(22) Filed: Jul. 28, 2010

(65) Prior Publication Data

US 2011/0026041 A1   Feb. 3, 2011

(30) Foreign Application Priority Data

Jul. 29, 2009   (DE) .................. 10 2009 028 068

(51) Int. Cl.
*G01B 11/02*   (2006.01)

(52) U.S. Cl.
USPC ........................................................ 356/498

(58) Field of Classification Search
USPC ................. 356/4.09, 493, 498, 500
See application file for complete search history.

(56) References Cited

U.S. PATENT DOCUMENTS

| | | | | |
|---|---|---|---|---|
| 4,086,808 | A * | 5/1978 | Camac et al. ................... | 73/655 |
| 4,714,339 | A * | 12/1987 | Lau et al. ...................... | 356/4.09 |
| 5,333,048 | A | 7/1994 | Michel et al. | |
| 6,097,491 | A * | 8/2000 | Hartrumpf .................... | 356/622 |
| 7,358,516 | B2 * | 4/2008 | Holler et al. ............. | 250/559.33 |
| 7,583,374 | B2 * | 9/2009 | Nara .......................... | 356/152.3 |
| 7,872,733 | B2 * | 1/2011 | Taketomi et al. ............ | 356/4.09 |

FOREIGN PATENT DOCUMENTS

| EP | 0 417 665 A2 | 3/1991 |
|---|---|---|
| EP | 0 481 356 A2 | 4/1992 |

OTHER PUBLICATIONS

Williams, C.C., et al., "Absolute Optical Ranging with 200-nm Resolution," Optics Letters, vol. 14, No. 11, Jun. 1, 1989, pp. 542-544.
Nakamura, O., et al., "Four-beam Laser Interferometry for Three-dimensional Microscopic Coordinate Measurement," Applied Optics, vol. 33, No. 1, Jan. 1, 1994, pp. 31-36.

* cited by examiner

*Primary Examiner* — Michael A Lyons
(74) *Attorney, Agent, or Firm* — Brinks Hofer Gilson & Lione

(57) ABSTRACT

A position measuring arrangement that includes a retroreflector, a light source generating a lightbeam and a scanning unit that generates a partially-divergent lightbeam. The scanning unit includes a scanning mirror mounted so it is deflected in a reproducible manner so that a grid-like scanning of a two-dimensional spatial area by the partially-divergent lightbeam takes place over a plurality of scanning tracks. The position measuring arrangement including an interferometric distance measuring unit that includes a beam splitter element that splits the lightbeam generated by the light source so that split lightbeams pass through a reference arm and a measuring arm at least once in each direction. The interferometric distance measuring unit includes an opto-electronic detector unit, through which a detection of distance-dependent signals from superimposed lightbeams from the reference arm and the measuring arm takes place.

14 Claims, 3 Drawing Sheets

POSITION MEASURING ARRANGEMENT

RELATED APPLICATIONS

Applicants claim, under 35 U.S.C. §119, the benefit of priority of the filing date of Jul. 29, 2009 of a German patent application, copy attached, Serial Number 10 2009 028 068.5, filed on the aforementioned date, the entire contents of which is incorporated herein by reference.

BACKGROUND

1. Technical Field

The present invention relates to a position measuring arrangement for determining the position of a spatial point in relation to a reference system.

2. Background Information

Various known approaches exist for determining the position of a spatial point in relation to a reference system.

For one, in the field of mechanical engineering, for example, so-called indirect measuring methods are known, in which the position of a movable spatial point in relation to a stationary reference system is determined by combining position-measuring values from several linear encoders. This can relate to the determination of the position of a movable machine part, such as the so-called "tool center point (TCP)", for example, in relation to a stationary machine part. Here, linear encoders are employed for detecting the displacement movements of axes which are perpendicularly oriented in relation to each other. The position of the spatial point of interest, such as the TCP, for example, can then be determined in a known manner by combining the positional values for the different axes.

Moreover, so-called direct measuring methods or measuring devices, have become known, in which a direct determination of the position of a movable spatial point, for example, in relation to a stationary reference system takes place. An example of a direct measuring method is described in EP 417 665 A2. The position measuring arrangement for determining the two-dimensional-position and/or orientation of a spatial point, disclosed in this publication, provides several retroreflectors, arranged at fixed distances in a stationary manner in space along a straight line. Furthermore, a scanning unit of the spatial point which will be of interest is arranged, which has a movably mounted scanning mirror, as well as an optoelectronic unit. Periodic grid-like scanning of the space takes place by a lightbeam. A signal can be generated with the aid of the opto-electronic detector unit if, at the time of optical contact between the scanning unit and the respective retroreflector, a back reflection of the lightbeam from the retroreflector in the direction of the scanning unit results. At the time of optical contact between the scanning unit and the retroreflector, the impact angle of a lightbeam reflected back by the retroreflector in the direction of the scanning unit is determined by an evaluation unit which responds to the signal from the opto-electronic detector unit. It is then possible to make a direct determination of the position of the spatial point from the calculations of the angular measurements to several retroreflectors and with the aid of the known distances between the retroreflectors. In this known arrangement, it is provided to scan the space containing the retroreflectors by a bundled lightbeam. No further details regarding the embodiment of a suitable optical device or the scanning unit can be found in this publication. It should be mentioned that a disadvantage of this method is that it is merely based on a two-dimensional position determination wherein the retroreflectors must be arranged along a straight line. In case of tilting of the straight line in relation to the scanning unit, no optical contact between the retroreflectors and the scanning unit exists anymore, so that false measurements result. Moreover, based on the use of a bundled lightbeam, only a brief optical contact results, as well as only a narrow permissible twist angle between the retroreflectors and the scanning unit, which can also cause errors in the measurement.

OBJECTS AND SUMMARY OF THE INVENTION

It is an object of the present invention to create, with low complexity and with high reliability, a position measuring arrangement for determining a precise position of a spatial point.

In accordance with the present invention, this object is attained by a position measuring arrangement that includes a retroreflector, a light source generating a lightbeam and a scanning unit that receives the lightbeam and generates a partially-divergent lightbeam. The scanning unit includes a scanning mirror that is mounted so it can be deflected in a reproducible manner around two different rotating axes that cross each other in a center of the scanning mirror. A grid-like scanning of a two-dimensional spatial area by the partially-divergent lightbeam is performed, in relation to which the retroreflector is arranged, takes place over a plurality of scanning tracks, wherein either 1) the retroreflector is arranged in a stationary manner in the spatial area, and the scanning unit is arranged in an area of a spatial point, or 2) the scanning unit is arranged in a stationary manner in the spatial area, and the retroreflector in the area of the spatial point. The position measuring arrangement further includes an interferometric distance measuring unit that includes a beam splitter element that splits the lightbeam generated by the light source in such a way that split lightbeams pass through a reference arm and a measuring arm at least once in each direction, and wherein the measuring arm is formed in the area of the spatial point in which the partially-divergent lightbeam is propagated by the scanning unit in a direction of the retroreflector and back. The interferometric distance measuring unit includes an opto-electronic detector unit, through which a detection of distance-dependent signals from superimposed lightbeams from the reference arm and the measuring arm takes place when, at a time of optical contact between the scanning unit and the retroreflector, a back reflection of the lightbeam from the retroreflector in a direction of the scanning unit results.

The position measuring arrangement for the determination of the position of a spatial point includes at least one retroreflector, a light source, as well as a scanning unit, to which a lightbeam provided by the light source can be conducted, as well as an interferometric distance-measuring unit. Here, the retroreflector is either arranged in a stationary manner in the space and the scanning unit is arranged in the area of the spatial point, or the scanning unit is arranged in a stationary manner in the space and the retroreflector is arranged in the area of the spatial point. The scanning unit has at least one scanning mirror, which is mounted so that it can be deflected in a reproducible manner around two different rotating axes, which cross in the center of the scanning mirror, so that a grid-like scanning of a two-dimensional spatial area, in relation to which at least one retroreflector has been arranged, takes place by means of a partially divergent lightbeam over a plurality of scanning tracks. The interferometric distance-measuring unit has a beam splitter element that splits the lightbeam provided by the light source in such a way that split lightbeams pass through a reference arm and a measuring arm at least once in each direction, and the measuring arm is formed in that area, in which the partially divergent lightbeam is propagated from the scanning arrangement in the direction of the retroreflector and back. The interferometric distance-measuring unit further includes an opto-electronic detector unit, by which a detection of distance-dependent signals from superimposed lightbeams from the reference arm and the measuring arm takes place if, at the time of optical contact between the scanning unit and the retroreflector, a back reflection of the lightbeam from the retroreflector in the direction of the scanning unit results.

Preferably a plurality of retroreflectors is provided, which are arranged in a stationary manner at fixed positions in the space. Three-dimensional position data regarding the spatial point are determined by an evaluation unit from the detected distances between the scanning unit and the retroreflectors.

In connection with a possible embodiment of the present invention, a partitioning of the lightbeam impinging on a polarization-optical beam splitter of the interferometric distance-measuring unit causes lightbeams in the measuring arm and in the reference arm to be formed, which are polarized orthogonally in relation to each other. The opto-electronic detector unit of the interferometric distance-measuring unit detects several phase-shifted scanning signals.

It is furthermore possible to arrange the light source, the interferometric distance-measuring unit and the scanning unit in a common structural unit in the area of the spatial point whose position is to be detected.

In a possible variation, the position measuring arrangement in accordance with the present invention further includes an identification structure for clearly identifying a particular retroreflection among the plurality of retroreflections, with which an optical contact with the scanning unit has just been established.

Finally, it is possible for the evaluation unit to be embodied in such a way that it analyzes the resultant distance-dependent signals at defined intervals and checks to determine whether there is optical contact between a retroreflector and the scanning unit. In the case optical contact is detected, the evaluation unit evaluates the distance-dependent signals and determines interferometrically the distance between the scanning unit and the retroreflector.

In a further embodiment, the scanning mirror can be arranged in the scanning unit and be gimbal-mounted by flexures.

Both rotating axes of the scanning mirror are advantageously oriented perpendicularly in relation to each other.

Moreover, the position measuring arrangement in accordance with the present invention can include a drive means for resonant driving of the two rotating axes of the scanning mirror, wherein the drive means is embodied so that the two rotating axes can be deflected with different scanning frequencies.

It is furthermore possible that the drive means resonantly drives the two rotating axes of the scanning mirror so that the mirror periodically scans the two-dimensional spatial area, and the partially divergent lightbeam covers several adjoining scanning tracks in a two-dimensional spatial area, in which at least one retroreflector is arranged.

Moreover, it is possible for an optical element to be arranged between the light source and the scanning mirror and be embodied so that it focuses the light beam emitted from the light source into the vicinity of the mirror plane of the scanning mirror or onto the plane of the scanning mirror. Following reflection at the scanning mirror, a partially divergent lightbeam for the periodic grid-like scanning of the spatial area is generated.

In this case, the optical element can be embodied in such a way that the angle of divergence of the partially divergent lightbeam, which is reflected by the scanning mirror in the direction of the scanned spatial area, is greater than the maximum angular distance between adjoining scanning tracks in the scanned spatial area.

However, it is also possible for the light source to be embodied as a semiconductor laser so that the generation of a partially divergent lightbeam by the light source occurs without further optical elements being arranged in front of the light source.

It is finally possible for an optical element and a diaphragm to be arranged in the reference arm, which are embodied in such a way that the wavefront curvature of the lightbeams that reach the detector elements of the opto-electronic detector unit from the reference arm is matched to the wavefront curvature of the lightbeams that reach the detector elements of the opto-electronic detector unit from the measuring arm.

It should be mentioned that the present invention has a definite advantage over the above discussed state of the art in that it has no significant limitations to the arrangement of the stationary retroreflectors, i.e. these can be positioned relatively flexibly as a function of the measuring configuration. For this reason, because of the use of a highly reproducible scanning mirror it is possible to employ an extremely exact interferometric length measuring method. Moreover, because of the partially divergent lightbeam used, it is assured that relative long optical contact times result between the scanning unit and the retroreflectors, which has a positive effect on the measuring accuracy and measuring resolution.

Further details and advantages of the present invention will be explained by the following description of an exemplary embodiment in connection by the attached drawing figures.

BRIEF DESCRIPTION OF THE DRAWINGS

Shown are in.

DETAILED DESCRIPTION OF THE PREFERRED EMBODIMENTS

Figure 1:
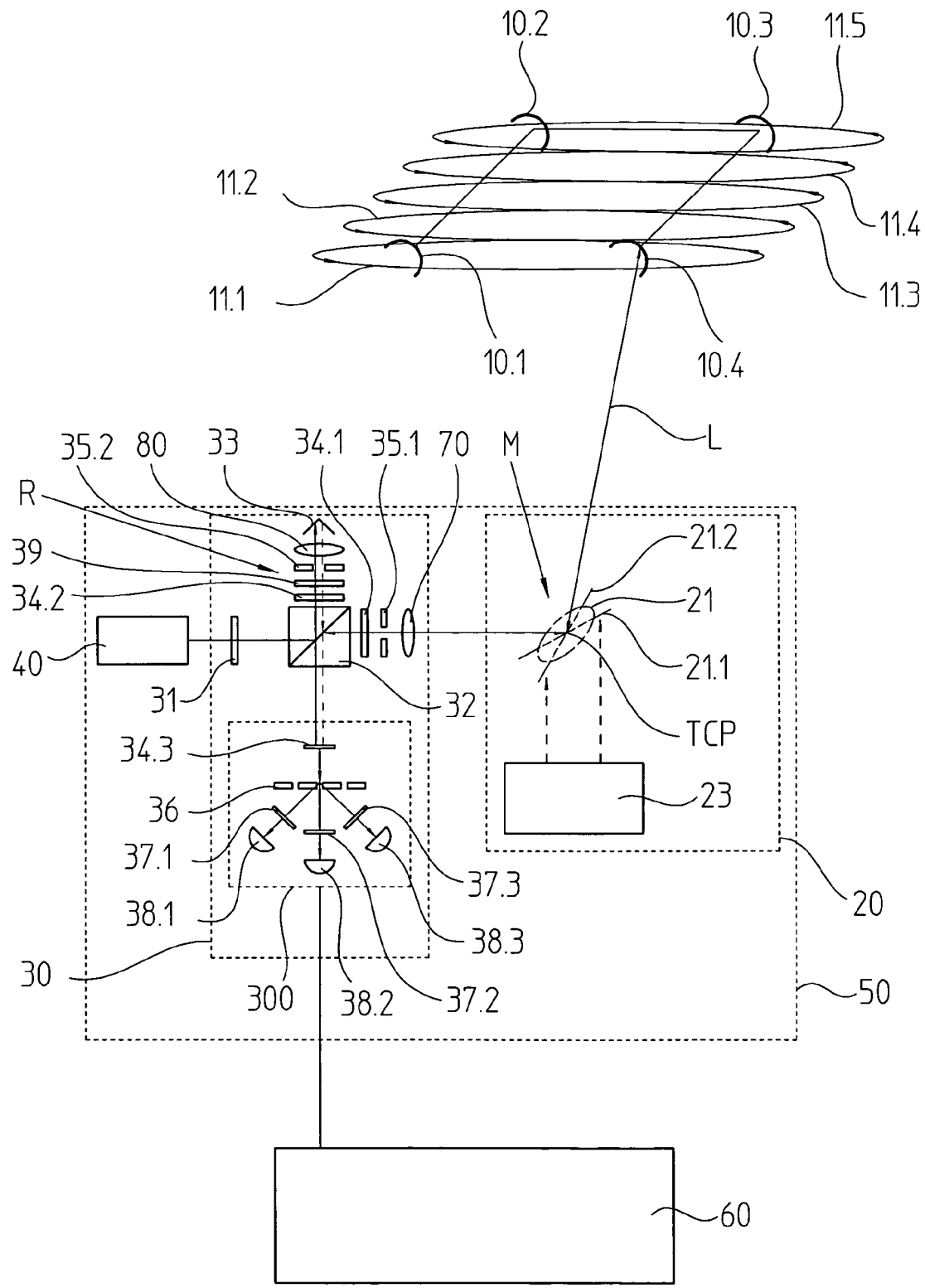
FIG. 1 shows a greatly schematized representation of an exemplary embodiment of a position measuring arrangement in accordance with the present invention.
Figure 2A:
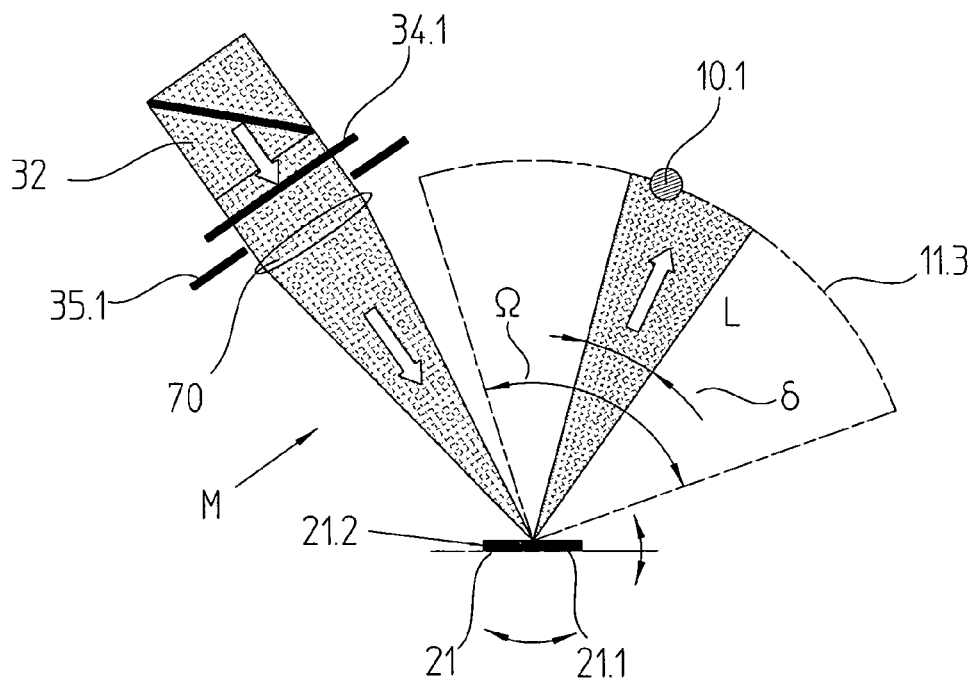
FIGS. 2a, 2b show respective schematized representations of portions of a possible beam path along a measuring beam direction of the position measuring arrangement in FIG. 1.
Figure 2B:
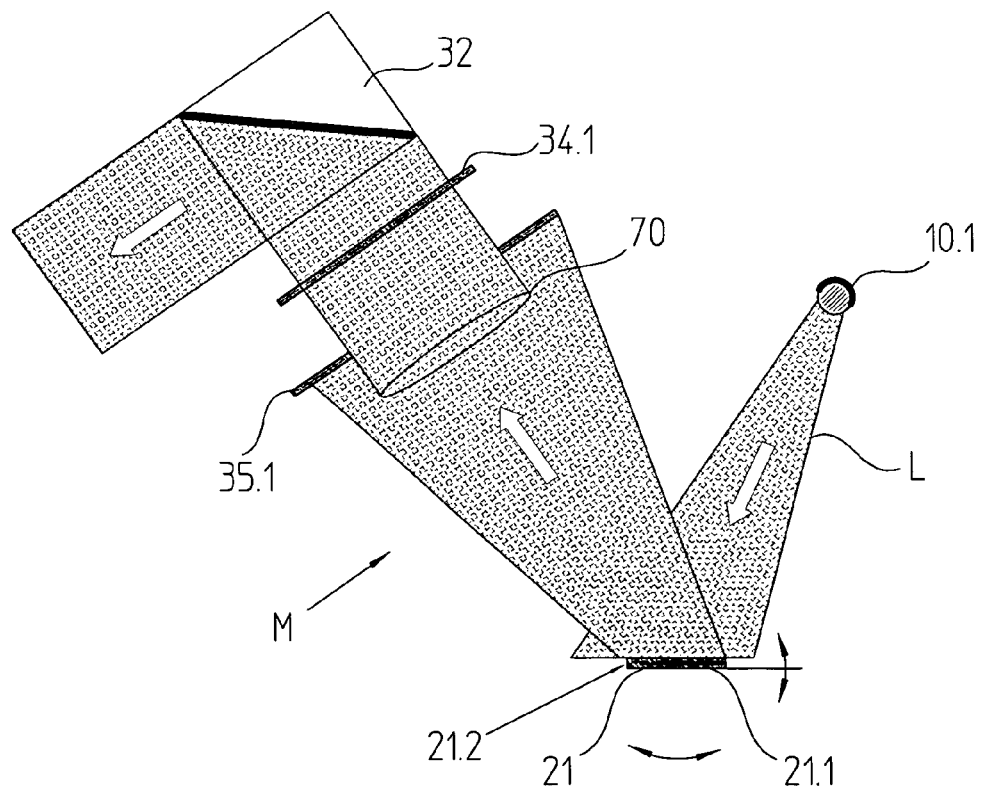
Figure 3A:
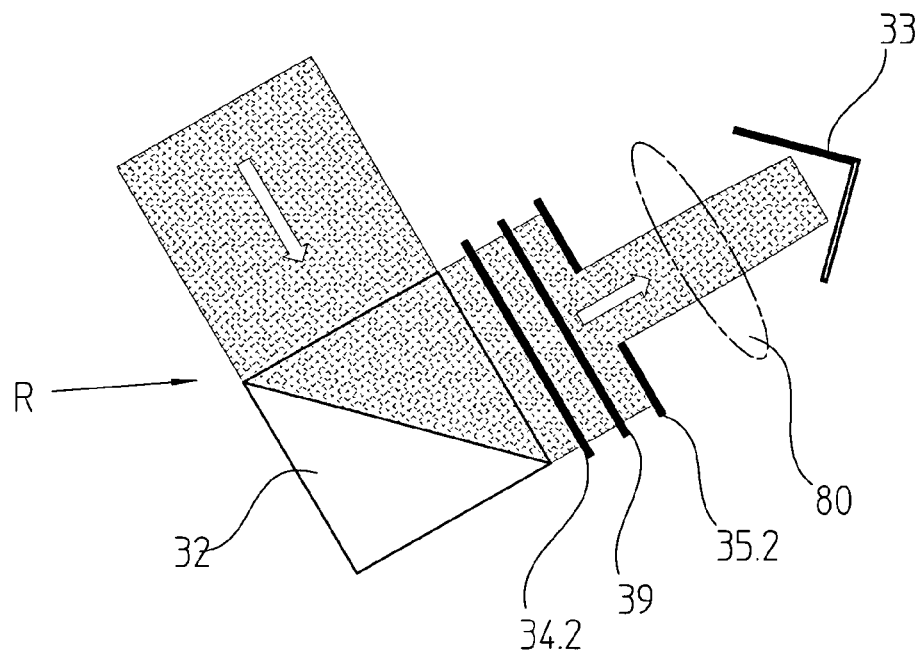
FIGS. 3a, 3b show respective schematized representations of portions of a possible beam path along a reference beam direction of the position measuring arrangement in FIG. 1.
Figure 3B:
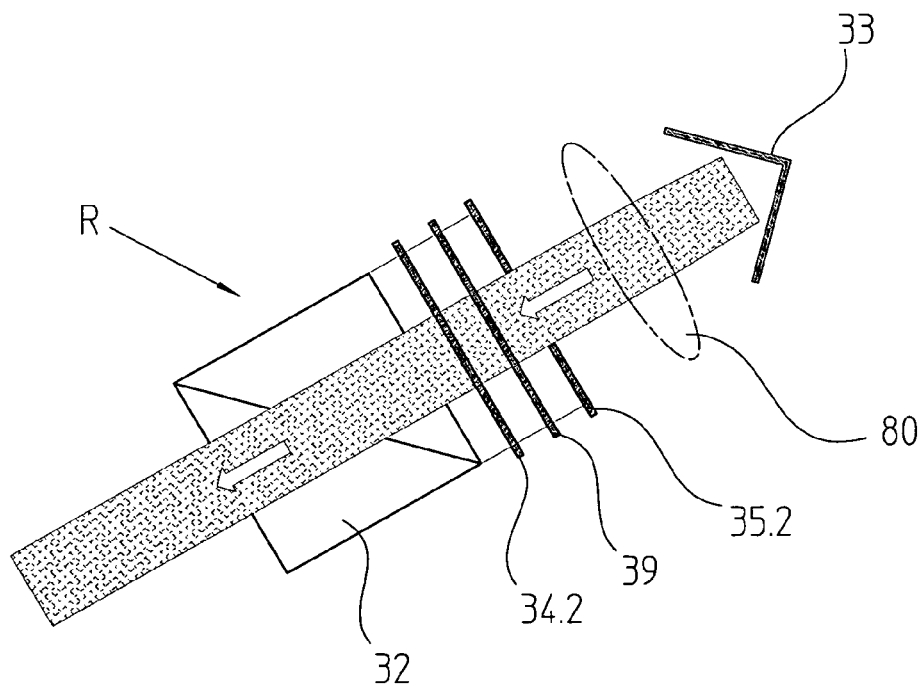

A possible exemplary embodiment of the position measuring arrangement in accordance with the present invention is represented in FIG. 1 in a greatly schematized form. FIGS. 2a and 2b or FIGS. 3a and 3b show portions of the beam path of this position measuring arrangement in enlarged views. For example, FIG. 2a illustrates the measuring arm with the illumination beam path for the grid-like scanning of the spatial area. FIG. 2b shows the measuring arm with the detection beam path for determining the distance between the scanning unit and a retroreflector. FIG. 3a shows the beam path in the reference arm in the direction of the reflector. FIG. 3b shows the beam path of the reference arm in the direction of the detection unit, starting at the reflector.

Essentially, the exemplary embodiment of the position measuring arrangement in accordance with the present invention is represented in FIG. 1. The position measuring arrangement includes several retroreflectors 10.1 to 10.4, arranged in the space in a stationary manner, a light source 40, a scanning unit 20, as well as an interferometric distance-measuring unit 30. Furthermore, an evaluation unit 60 is represented in FIG. 1. The direct determination of the position of a spatial point TCP in relation to a reference system is possible with the aid of the position measuring arrangement in accordance with the present invention. Of the various components indicated, at least the scanning unit 20 is assigned in a definite spatial relationship to the spatial point TCP which is of interest or to be detected.

For example, this spatial point TCP can be the previously mentioned so-called "tool center point" of a processing machine, whose spatial position in relation to a machine reference system is to be directly determined. In this connection, it is possible to arrange the light source 40, the interferometric distance-measuring unit 30 and the scanning unit 20 in a common unit 50 in the form of an optical measuring head within the area of the spatial point TCP which is to be detected. Such a unit 50, or respectively optical measuring head could be arranged, similar to a known probe head, in the tool spindle of the processing machine. The various retroreflectors 10.1 to 10.4 have been placed in the processing room of the machine at positions with known coordinates, by which the reference system is defined.

It should be pointed out that an arrangement of the light source 40, of the interferometric distance-measuring unit 30 and of the evaluation unit 60 does not have to take place absolutely either in the immediate neighborhood of the scanning unit 20 or in a common structural unit 50 in the area of the spatial point TCP to be detected. Alternatively, it is possible to arrange the light source spatially distant therefrom and to guide the bundle of beams emitted by the light source by optical fibers to the area of the spatial point to be detected or to the scanning unit. In the case of the interferometric distance-measuring unit, it can be provided to supply the bundle of beams to it via optical fibers and not to place the interferometric distance-measuring unit into the immediate vicinity of the scanning unit 20. Furthermore, it is also not absolutely necessary to place the evaluation unit 60 directly adjoining the scanning unit 20, i.e. the former can also be arranged at a different location, and the signals can be provided to the interferometric distance-measuring unit 30 through suitable connecting signal lines.

The retroreflectors 10.1 to 10.4 are, for example, embodied as cat's eye reflectors or triple mirrors and assure that a light beam impinging on them is reflected back in the impinging direction. In case a plurality of retroreflectors 10.1 to 10.4 are employed, the arrangement of the retroreflectors 10.1 to 10.4 preferably takes place in such a way that they are not aligned along a straight line. In order to assure a comparable position resolution along all three spatial directions it is advantageous if an enclosed area is formed by the arrangement of the scanning plane being above the retroreflectors 10.1 to 10.4 so that the size of the enclosed area corresponds to at least a quarter of the total scanning area.

In an arrangement in accordance with the present invention, a laser, which preferably is designed as a semiconductor laser, is employed as the light source 40. For example, the laser can be a frequency- and temperature-stabilized single-mode semiconductor laser with a measuring wavelength $\lambda=1570$ nm. The coherence length of the light source 40 is preferably greater than twice the maximum distance between the retroreflectors 10.1 to 10.4 and the spatial point TCP, whose position is to be detected, and thus the coherence length defines the upper limit of the laser line width, which is measured in nanometers.

An important component of the scanning unit 20 of the arrangement in accordance with the present invention is a scanning mirror 21. The mirror 21 is mounted, movable around two different rotating axes 21.1, 21.2, and by which periodic grid-like scanning of a two-dimensional area by a partially divergent lightbeam L takes place. In the ideal case, the center of the scanning mirror here coincides with the spatial point TCP to be detected, or it is at least located in its close vicinity. Regarding further details of the scanning unit 20 and the scanning mirror 21, reference is made to the description which follows.

In the present example shown in FIG. 1, a total of four retroreflectors 10.1 to 10.4 are arranged in the scanned spatial area. If in the course of scanning the spatial area, the partially divergent lightbeam L sweeps one of the retroreflectors 10.1 to 10.4, a back reflection of the lightbeam L takes place from the respective retroreflector 10.1 to 10.4 in the direction of the scanning unit 20. An interferometric distance-measuring unit is provided that has a measuring arm embodied in the area in which the partially divergent lightbeam L is propagated by the scanning unit 20 to the retroreflectors 10.1 to 10.4 and back. With the aid of the interferometric distance-measuring unit 30, it is possible at the time of the optical contact between the scanning unit 20 and the respective retroreflector 10.1 to 10.4 to perform a highly precise interferometric distance measurement. For this purpose, the interferometric distance-measuring unit 30 contains a reference arm R, as well as a measuring arm M, through which the lightbeams, which have been split by a beam splitter element 32, pass at least once in each direction. As can be seen in FIG. 1, the measuring arm M is embodied in the area starting at the beam splitter element 32, in which the partially divergent lightbeam is propagated in the direction toward the retroreflector 10.1 to 10.4 and back. Regarding further details of the interferometric distance-measuring unit 30, reference is also made to the description which follows.

If, as in the exemplary embodiment represented in FIG. 1, several retroreflectors 10.1 to 10.4 are arranged in the scanned two-dimensional area, it is advantageous if a definite identification of one of the detected retroreflectors 10.1 to 10.4 is assured after each successful distance measurement. To this end, the position measuring arrangement in accordance with the present invention includes suitable identification structure. In a possible embodiment, the identification structure includes photodiodes, for example, which are applied in the direct surroundings of or directly to the retroreflectors 10.1 to 10.4 and generate a triggering signal when in optical contact with the scanning unit 20. The identification structure allows a clear assignment of the just generated interference signal to the respective retroreflector 10.1 to 10.4.

An alternative embodiment of the identification structure provides a chronological correlation of a detected interference signal with the deflection, and therefore the orientation, of the scanning mirror 21. Here, the determination of the mirror orientation can perhaps take place via the evaluation of the phase angles of the two frequencies driving the scanning mirror 21. To this end it would be necessary to realize a suitable electronic implementation of the evaluation unit 60, together with the drive means 23 of the scanning mirror.

In general, the following procedure is followed for the exact determination of the point in time for measuring and checking of the acceptability of the detected interference signal.

The evaluation unit 60 continuously analyzes the resultant interference signals at a defined frequency, which is clearly higher than the scanning frequency. For example, the interference signals are added together in order to reach a conclusion regarding the presence of an optical contact between the scanning unit 20 and the retroreflectors 10.1 to 10.4 via the maximal sum signal. As long as the respective sum signal lies below a threshold value to be defined, the situation is evaluated as "no optical contact existing". The interference signals are evaluated only in case of the detection of an optical contact, and the distance between the scanning unit 20 and the retroreflector 10.1 to 10.4 is interferometrically determined.

The assignment of the actual association of distance measurement to defined retroreflectors 10.1 to 10.4 becomes possible by the chronological correlation of the interference signals either by the electrical current of the photodiodes. It is also possible by the phase positions of the drive means and the calculation of the deflection angles of the scanning mirror 20 based on the phase positions of the drive means.

The respective distances between the four individual retroreflectors 10.1 to 10.4 and the scanning unit 20 or the spatial point TCP can be determined following the performance of the grid-like scanning of the two-dimensional area represented in FIG. 1 by the scanning tracks 11.1 to 11.5. The direct three-dimensional position, or coordinate determination, of the spatial point TCP of interest by the evaluation unit 60 is then possible in connection with the fixed spatial position of the four retroreflectors 10.1 to 10.4 in relation to each other in the reference system. To this end, the evaluation unit 60 combines in a known manner the measurement data, i.e. the optically determined distances between the spatial point in relation to the retroreflectors 10.1 to 10.4 are combined together with the known position information regarding the spatial positions of the retroreflectors 10.1 to 10.4. The evaluation unit 60 determines the spatial point TCP by multilateration, such as is known, for example, from the publication by Osamu Nakamura, Mitsuo Goto, "Four-Beam Laser Interferometry for Three-Dimensional Microscopic Coordinate Measurement", Applied Optics 33, 31-36 (1994).

Important advantages of the position measuring arrangement in accordance with the present invention are the result of the periodic, grid-like scanning of the two-dimensional area by the retroreflectors 10.1 to 10.4 with a partially-divergent lightbeam L. In contrast to known position measuring methods that utilize a tightly collimated lightbeam, the position measuring arrangement of the present invention avoids elaborate adjustment and installation processes of the scanning unit 20 in relation to the retroreflectors 10.1 to 10.4. Compared with position measuring arrangements operating with a fully divergent illumination of the spatial area with the retro-reflectors, the position measuring arrangement of the present invention advantageously provides a clearly higher signal intensity on the detection side based on the use of the partially divergent lightbeam L.

In contrast to a tightly collimated, or respectively fully collimated lightbeam, a partially-divergent lightbeam L should be understood to be a lightbeam, whose beam divergence lies between the minimal divergence of an ideally collimated, i.e. quasi-parallel lightbeam, and the maximum divergence of a fully-divergent lightbeam. A fully-divergent lightbeam is characterized by the complete illumination of the scanning plane in relation to which the retroreflectors are placed. A collimated lightbeam is defined by its intrinsic, narrowest-possible realizable divergence, along with ideal collimation, which is provided via the beam parameters and the beam waist.

In the exemplary embodiment represented in FIG. 1, the partial divergence of the lightbeam L in the measuring arm M is assured through an optical element 70, which is arranged in the beam path between the light source 40 and the scanning mirror 20. In this case the optical element 70 is embodied as a lens, by whose optical properties the beam divergence of the lightbeam L is suitably set.

As can be seen from FIG. 2a, the lens or the optical element 70, is embodied in such a way that focusing of the lightbeam emitted by the light source—not represented in FIG. 2a—into the vicinity of the mirror plane of the scanning mirror 21 or into the vicinity of the center of the mirror, takes place. Following the reflection at the scanning mirror 21, a partially-divergent lightbeam L with the divergence angle δ and propagated in the direction of the retroreflector 10 results. The area in the sketched-in spatial angular area Ω is periodically scanned in a grid-like manner by the partially-divergent lightbeam L. As can be seen in FIG. 2b, the optical element 70 has a slight optical focusing effect on the lightbeam retroreflected by the retroreflector 10.1 in the direction of the scanning unit 20 following the reflection in the scanning mirror 21. As a result, one, or respectively several lightly focused beam bundles are propagated in the direction of the beam splitter element 32 and the detector unit arranged downstream. In this way it is assured that these beam bundles are always coupled into the coupling-in face of the detector unit 300 at a fixed, preferably vertical angle.

It should be expressly pointed out here that alternatively to this it is also possible to completely omit the optical element 70, or respectively to arrange the optical element 70 between the light source 40 and the beam splitter 32. The solution to be selected is a function of the mean distance of the spatial point TCP from the retroreflectors 10.1 to 10.4, and therefore must be adapted to the respective measuring task. Without the optical element 70, nearly parallel lightbeams are collected via the scanning mirror 21 because of the relatively large distance between the spatial point TCP and the retroreflectors 10.1 to 10.4.

In case of the employment of an optical element 70, it is also advantageously assured that the divergence angle δ of the lightbeam L is greater than the maximum angular distance between adjoining scanning tracks 11.1 to 11.5 in the scanned spatial area by the dimensioning of the optical element 70.

It is furthermore advantageous for the arrangement of the retroreflectors 10.1 to 10.4 and the set partial divergence of the lightbeam to be selected in such a way that only a single retroreflector 10.1 to 10.4 can be present in an optical beam lobe. In this way it is assured that an unequivocal allocation of the respective retroreflector 10.1 to 10.4 for the distance measurement takes place when the optical contact is established.

Besides the explained variation with the optical element 70, there is a number of further possibilities for setting the required partial divergence of the lightbeam L, which will be briefly sketched in what follows.

For setting the desired partial divergence of the lightbeam L or its optical functionality, the optical element 70 can also be designed in an alternative way. In this way, it becomes possible to embody it as a diffractive optical element. In the same way it would be conceivable to embody the optical element as a curved mirror having a focusing optical effect. Because of the resultant beam bending it would be possible to assure a particularly compact embodiment of the device in accordance with the present invention; moreover, such a reflective optical device would reduce the optical losses in the beam path.

Furthermore, there is the possibility within the framework of the present invention to insure the partial divergence of the lightbeam L being propagated in the direction of the retroreflectors 10.1 to 10.4 by an optical element arranged at another location in the beam path. In this case it would perhaps be possible to place an appropriate optical element between the light source 40 and the beam splitter in order to set the required partial divergence of the lightbeam L in this way.

In a further alternative to the represented exemplary embodiment it can furthermore also be provided to employ the natural divergence of a suitable light source, in particular of a laser light source. For example, a semiconductor laser in the form of a so-called VCSEL light source (Vertical Cavity Surface Emitting Laser) could be employed which, provides a partially-divergent lightbeam L in the measuring beam path without separate optical elements,.

A further possibility for generating the partially-divergent lightbeam L exists in the case where light from a spatially distant light source is conducted via an optical waveguide to the scanning unit. Then, the required partial divergence of the lightbeam can be assured by a suitably selected aperture of the fiber end, or with the aid of a suitable optical element at the fiber end, etc.

Following the overview description of an exemplary embodiment of the device in accordance with the present invention, and of its basic functional principle, individual components, or respectively units thereof, will now be explained in detail, in particular the interferometric distance measuring unit 30, as well as the scanning unit 20.

Interferometric Distance Measuring Unit

In the optical position measuring arrangement in accordance with the present invention, the distance measurement between the scanning unit 20, or respectively the spatial point of interest, and the respective retroreflector 10.1 to 10.4 takes place, as already mentioned above, at the time of the optical contact by an interferometric distance measurement. Basically, this should be understood to be the generation of distance-dependent signals from the evaluation of phases of interfering superimposed lightbeams, which are propagated, separated from each other, in a reference arm R and a measuring arm M, and are recombined for detection. It is basically possible here to employ either an incremental-measuring system as well as an absolute-measuring interferometric method. It is also possible to make use of different wavelengths in the measuring and reference arms, and the use of interferometric running-time measurement methods is conceivable as well.

An incremental-measuring method is provided in the exemplary embodiment illustrated, in which several phase-shifted distance-dependent signals are generated by the interferometric distance measuring unit 30, and these are then further processed by the evaluation unit 60.

In the exemplary embodiment of the interferometric distance measuring unit 30 represented, the lightbeam provided by the light source 40 first passes through a beam-cleaning polarizer 31, and then reaches the above mentioned beam splitter element 32, which here is embodied in the form of a known polarizing beam-splitting cube. With the aid of the polarizing beam-splitting cube, splitting of the lightbeam impinging thereon into individual, differently linearly polarized lightbeams takes place, which subsequently are propagated in the reference arm R and the measuring arm M of the interferometric distance measuring unit 30. The orientation of the polarizer 31 and the polarization orientation of the light source 40 in relation to the optical axis of the polarization beam-splitting cube are selected in such a way that sufficient light is transmitted via both arms M, R. A so-called polarization coding of the beams in the measuring arm M and reference arm R is realized in this way.

The intensity relationship of the lightbeams which are subsequently propagated in the measuring and reference arms M, R, and which is important in connection with the degree of modulation of the distance-dependent signal to be measured, is furthermore set in a defined manner by means of the beam splitter element 32. Since, the diverging lightbeam L causes only a small back-reflected intensity in the measuring arm M, a selection of the intensity relationship in the range between 1:100 to 1:10,000,000 between the beam intensities in the reference arm R and the measuring arm M is advantageous. Supplementing this, it is also possible to provide a suitable beam-weakening element 39 in the reference arm R, such as can be seen in FIGS. 1 and 3a, 3b. The beam weakening resulting from this is set here as a function of the mean distance between the spatial point TCP and the retroreflectors 10.1 to 10.4, i.e. lesser beam weakening would be selected at shorter distances, etc.

As can be seen in FIG. 1, the reference arm R is formed in the beam path upstream of the scanning unit 20 and furthermore includes a polarization-optical component in the form of a $\lambda/4$ plate 34.2, whose optical axis is rotated by 45° in relation to the beamed-in polarization direction, a diaphragm 35.2, an optical element 80, as well as a stationarily-arranged reflector 33. The lightbeams propagated in the reference arm R therefore always pass over an always constant optical path length. The size of the diaphragm 35.2 arranged in the beam path, and the focal length of the optical element 80 placed downstream thereof, should be selected in such a way that an optimum overlap of the wave fronts in regard to the wave front curvature of the interfering lightbeams from the measuring arm M and the reference arm R in the area of the overlapping beam cross sections of both lightbeams is assured. Again, the optical element 80 can be embodied as a lens; however, alternative options for realizing its optical functionality are basically possible. Thus, perhaps the reflector in the reference arm R could be embodied in a suitably curved manner.

Use of the optical element 80 makes optimization of the degree of modulation of the detected signal possible. If optimization is not required, it is also possible to do without optical element 80 in the arrangement in accordance with the present invention.

The beam cross section is set by a suitable diaphragm 35.2 and, provided the diaphragm size has been correctly selected, also assures a satisfactory degree of modulation of the detected interference signals. It should be taken into consideration here that following the back-reflection at the reflector 33 the lightbeam of the reference arm R again passes through the optical element 80. Thereafter, passage through the diaphragm 35.2, the beam-weakening element 39, the $\lambda/4$ plate 34.2 and the beam splitter element 32 again takes place, and a reunification with the lightbeam L being propagated in the measuring arm M occurs at the beam splitter face.

The measuring arm M of the interferometric distance measuring unit 30 is embodied in that area in which the partially-divergent lightbeam L, starting at the beam splitter element 32, is propagated toward the scanning unit 20 in the direction of the retroreflectors 10.1 to 10.4 and back. On the side of the interferometric distance measuring unit 30 in the measuring arm M, and following the beam splitter element 32, a polarization-optical component in the form of a $\lambda/4$ plate 34.1, whose optical axis is rotated by 45° in relation to the beamed-in polarization direction, and a diaphragm 35.1, are provided. In the measuring arm M, the diaphragm 35.1 should also be selected in such a way that an optimal wavefront overlap regarding the wave front curvature in the area of the overlapping beam cross sections of the two beams is made possible from the interfering lightbeams from the reference arm R and the measuring arm M in an interplay with the diaphragm 35.2 and the optical element 80; a satisfactory degree of modulation of the interference signal is assured by this.

After the passage through these components, the lightbeam in the measuring arm M reaches the optical element 70, by which the required partial divergence is impressed on the originally collimated lightbeam. Subsequently, the partially divergent lightbeam L in the measuring arm M impinges on the scanning mirror 21 of the scanning unit 20. The deflection in the direction of the spatial area to be scanned in a grid-like manner with the retroreflectors 10.1 to 10.4 arranged there takes place by the movably mounted scanning mirror 21. If the lightbeam L crosses one of the retroreflectors 10.1 to 10.4, the lightbeam is reflected back in the direction of the scanning mirror 21 and, after again passing through the optical element 70, finally reaches the diaphragm 35.1, the λ/4 plate 34.1, and the beam splitter element 32 as an again almost parallel or slightly focused lightbeam in a direction opposite to the previous passage. Finally, the superimposed lightbeams are propagated from the beam splitter surface of the beam splitter element 32, embodied as a polarization beam-splitting cube, in the direction of an opto-electronic detector unit 300, in which the interfering lightbeams are detected and a distance-dependent signal is determined.

In the example represented, the opto-electronic detector unit 300 includes a further λ/4 plate 34.3, a splitting grating 36 for splitting the pair of lightbeams from the measuring and reference arms M, R impinging on it, as well as respective analyzers 37.1 to 37.3 in the split beam paths, as well as respective detector elements 38.1 to 38.3. A so-called polarization coding of the phase-shifted distance-dependent signals resulting at the detector elements 38.1 to 38.3 is realized by such a detector variation in the interferometric distance measuring unit 30. Then incremental scanning signals, respectively phase-shifted by 120°, are present at the detector elements 38.1 to 38.3, which can be further processed by the evaluation unit 60. Regarding the embodiment of the opto-electronic detector unit 300 and its detailed mode of operation, reference is made to EP 481 356 A2 of Applicant.

Alternatively to the incremental interferometric distance measurement provided here it is of course also possible, as already mentioned above, to employ an absolute interferometric method, by which the distances between the scanning unit 20 and the retroreflectors 10.1 to 10.4 are directly or absolutely determined. A suitable method is for example known from the publication by C. C. Williams, H. K. Wickramasinghe, "Absolute Optical Ranging with 200 nm Resolution", Optics Letters, 14, 542-544 (1989).

Scanning Unit

As already indicated at the outset, the scanning unit 20 of the arrangement in accordance with the present invention is used to scan, preferably two-dimensionally, the space containing the retroreflectors 10.1 to 10.4 placed there by a partially-divergent lightbeam L via the movably mounted mirror 21. In case of an optical contact with a retroreflector 10.1 to 10.4, a highly precise distance measurement is performed by the interferometric distance measuring unit.

The scanning mirror 21, which is mounted, deflectable in a definite manner around two different rotating axes 21.1, 21.2, represents an important component of the scanning unit 20. In this case, the two rotating axes 21.1, 21.2 cross in the center of the scanning mirror 21. In a preferred embodiment, the scanning mirror 21 is arranged in the scanning unit 20 and is gimbal-mounted by flexures, while the two rotating axes 21.1, 21.2 are oriented perpendicularly in relation to each other.

For example, the scanning mirror 21 can include a support substrate of crystalline silicon, which is covered by a thin mirror layer of a highly reflecting material in accordance with the light wavelength used. Here it is furthermore important for the mirror surface to be shaped sufficiently level. Therefore, the radius of the surface curvature of the scanning mirror 21 should be less than 1 m, if possible.

Various embodiment options exist regarding the geometry of the scanning mirror 21. Thus, it can be designed to be round, angular or also oval. The diameter of the scanning mirror 21 used preferably lies in the range between 50 µm and 5 mm.

The scanning mirror 21 is driven by drive means 23, schematically indicated in FIG. 1, around the two rotating axes 21.1, 21.2, which are oriented perpendicularly to each other. Driving the scanning mirror 21 by the drive means 23 can take place in a known manner by electrical alternating fields, which cause attractive and repellent forces to act between the scanning mirror 21 and a non-represented frame. The two rotating axes 21.1, 21.2 are each preferably driven resonantly and at a fixed phase relation to each other, for example with a phase difference of 90° at an odd, whole-number frequency ratio (or respectively 0° at an even, whole-number frequency ratio). Therefore the two rotating axes 21.1, 21.2 are driven at different scanning frequencies, because of which particularly large deflection angles, and therefore also large scanning angles, become possible for the scanning mirror 21. Thus, for example with a work volume of 1 $m^3$ and a typical distance of 1 m between the spatial point and the retroreflectors 10.1 to 10.4, a scanning angle larger than 90°, or respectively a deflection angle of the scanning mirror 21 greater than ±22.5°, becomes necessary.

It is furthermore advantageous if the natural frequencies of the scanning mirror 21, which result from the respective mounting geometry, the scanning mirror geometry and the material used, are selected to be greater than the typical mechanical machine frequencies of the processing machine in connection with which the arrangement in accordance with the present invention is being used.

There are various options regarding the selection of suitable scanning frequencies and of the phase relation between the scanning frequencies for the two rotating axes 21.1, 21.2 to be set.

Thus, it can be provided in a first embodiment variation to drive one of the two rotating axes 21.1, 21.2 at a high scanning frequency, and the other one of the two rotating axes 21.1, 21.2 at a lower scanning frequency via the drive means 23. In case of an odd whole number frequency ratio of the scanning frequencies, the phase difference is selected to be 90°, and in case of an even whole number frequency ratio of the scanning frequencies, to be 0°. The minimum scanning rate of a point in the scanned two-dimensional spatial area is defined in this way by the lower of the two scanning frequencies. A ratio of the two scanning frequencies of 1:5 or greater is preferably set in this area.

However, in a second embodiment variation, two relatively high scanning frequencies, which have a defined frequency difference in relation to each other, are selected for driving the two rotating axes 21.1, 21.2. In this case the scanning frequency difference set defines the minimum scanning rate of a point in the scanned two-dimensional spatial area.

In both variations the scanning frequencies of the rotating axes 21.1, 21.2 have preferably been selected to be such that a minimum scanning frequency of higher than 10 Hz, ideally higher than 1,000 Hz, results for each point in the scanned two-dimensional space. The higher the possible scanning frequency of the scanning unit 20 being employed is selected to be, the more dynamic movements of the point in space, which are to be detected, can be determined.

The frequency ratio set for the driving, or respectively scanning, frequencies of the two rotating axes 21.1, 21.2 can be important, moreover for the minimally required angle of divergence of the lightbeam L, since it has to be assured that, following a scanning cycle across the respective two-dimensional spatial area, the latter must be completely covered. Regarding the angle of divergence of the lightbeam L, which is reflected by the scanning mirror 21 in the direction of the scanned spatial area, it is required here that it must be selected to be greater than the maximal angular distance between adjoining scanning tracks 11.1 to 11.5 in the scanned spatial area.

In closing, in regard to the scanning unit 20 it should also be mentioned that it is particularly advantageous if the support of the scanning mirror 21 is, if possible, connected or coupled in a mechanically rigid manner with the light source used, or with the fiber end, via which the radiation from a remote light source is supplied. By this it is assured that the optical axis of the beam path defined by the light source 40 always points to the same point of the scanning mirror 21. It is possible to assure a high degree of reproducibility of the measurements by this.

Within the framework of the present invention, there are of course alternative embodiment options regarding a position measuring arrangement, besides the explained exemplary embodiment. Some of these possibilities will be briefly sketched in what follows.

It is therefore not at all imperative for several retroreflectors to be employed in the device in accordance with the present invention. Instead, there are also measuring jobs which, for example, only require the detection of one single distance point from the spatial point which needs to be measured. In this case, a single retroreflector in the scanned spatial area would be sufficient.

In the same way, it is possible alternatively to the represented exemplary embodiment to attach the at least one retroreflector at the spatial point to measured on a support plate, for example, and to arrange the scanning unit, or respectively a corresponding measuring head, in a stationary manner in the space, thus reversing the measurement arrangement.

The device in accordance with the present invention can furthermore be supplemented by an angle-measuring position measuring arrangement. For example, this includes an imagining optical device, by which a lightbeam is projected at a defined angle of incidence onto a detection unit. The angle of incidence can be determined by known triangulation methods, so that a number of additional degrees of freedom of the movement of the spatial point can be detected, for example one or several degrees of freedom of rotation of the same.

Finally, it can be provided to embody the scanning unit not only with a single scanning mirror, but instead to arrange a plurality of scanning mirrors there, which are triggered in a defined manner. Such a further design of the device in accordance with the present invention makes sense, for example, in case even more degrees of freedom of the spatial point are to be detected, for example if it is intended to detect yet one or several degrees of freedom of rotation, besides the purely three-dimensional coordinate determination. Moreover, in comparison with a single-mirror system it is possible in the case of several scanning mirrors to reduce the required spatial angular area D of each individual mirror. In the case of several scanning mirrors it is furthermore possible to scan overlapping spatial areas by means of the different scanning mirrors.

The foregoing description is provided to illustrate the present invention, and is not to be construed as a limitation. Numerous additions, substitutions and other changes can be made to the present invention without departing from its scope as set forth in the appended claims.

We claim:

1. A position measuring arrangement for determining the position of a spatial point, the position measuring arrangement comprising:
    a retroreflector;
    a light source generating a lightbeam;
    a scanning unit that receives said lightbeam and generates a partially-divergent lightbeam, wherein said partially-divergent lightbeam is defined to have a beam divergence that lies between a minimal divergence of an ideally collimated lightbeam and a maximal divergence of a fully-divergent lightbeam, wherein said scanning unit comprises:
        a scanning mirror that is mounted so it is deflected in a reproducible manner around two different rotating axes that cross each other in a center of said scanning mirror so that a grid-like scanning of a two-dimensional spatial area by said partially-divergent lightbeam, in relation to which said retroreflector is arranged, takes place over a plurality of scanning tracks, wherein either 1) said retroreflector is arranged in a stationary manner in said spatial area, and said scanning unit is arranged in an area of a spatial point, or 2) said scanning unit is arranged in a stationary manner in said spatial area, and said retroreflector in said area of said spatial point;
    an interferometric distance measuring unit comprising:
        a beam splitter element that splits said lightbeam generated by said light source in such a way that split lightbeams pass through a reference arm and a measuring arm at least once in each direction, and wherein said measuring arm is formed in said area of said spatial point in which said partially-divergent lightbeam is propagated by said scanning unit in a direction of said retroreflector and back;
        an opto-electronic detector unit, through which a detection of distance-dependent signals from superimposed lightbeams from said reference arm and said measuring arm at a time of optical contact between said scanning unit and said retroreflector, a back reflection of said lightbeam from said retroreflector in a direction of said scanning unit results.

2. The position measuring arrangement in accordance with claim 1, further comprising:
    a second retroreflector, wherein said retroreflector and said second retroreflector are stationarily arranged in fixed positions in said spatial area;
    an evaluation unit that determines three-dimensional position data regarding said spatial point from a detected distance between said scanning unit and said retroreflector and said second retroreflector.

3. The position measuring arrangement in accordance with claim 1, further comprising:
    a polarization-optical beam splitter of said interferometric distance measuring unit that splits impinging lightbeams into lightbeams that are orthogonally polarized in relation to each other, wherein said impinging lightbeams are split in said measuring arm and said reference arm; and
    said opto-electronic detector unit is designed in such a way that detection of several phase-shifted distance-dependent signals takes place by said opto-electronic detector unit.

4. The position measuring arrangement in accordance with claim 1, wherein said light source, said interferometric distance measuring unit and said scanning unit are arranged in a common unit in said area of said spatial point whose position is to be detected.

5. The position measuring arrangement in accordance with claim 2, further comprising identification structure for positive identification of a specific retroreflector among said retroreflector and said second retroreflector with which optical contact with said scanning unit has been established.

6. The position measuring arrangement in accordance with claim 1, wherein said evaluation unit analyzes resulting distance-dependent signals at a defined frequency and checks whether there is an optical contact between said retroreflector and said scanning unit and, in case optical contact has been detected, evaluates said distance-dependent signals and determinates interferometrically a distance between said scanning unit and said retroreflector.

7. The position measuring arrangement in accordance with claim 1, wherein said scanning mirror is gimbal-mounted in said scanning unit via flexures.

8. The position measuring arrangement in accordance with claim 1, wherein said two rotating axes are oriented perpendicularly in relation to each other.

9. The position measuring arrangement in accordance with claim 1, which comprises a drive means for resonantly driving said two rotating axes in such a way that said two rotating axes can be deflected at different scanning frequencies.

10. The position measuring arrangement in accordance with claim 9, wherein said drive means is embodied in such a way that periodic scanning of said two-dimensional spatial area takes place, and said partially-divergent lightbeam passes over a plurality of adjacent scanning tracks in said two-dimensional spatial area, in which said retroreflector is arranged.

11. The position measuring arrangement in accordance with claim 1, further comprising an optical element arranged between said light source and said scanning mirror and is designed in such a way that said optical element focuses said lightbeam generated by said light source in a vicinity of a mirror plane of said scanning mirror and, following reflection at said scanning mirror, said partially-divergent lightbeam results for said periodic grid-like scanning of said spatial area.

12. The position measuring arrangement in accordance with claim 11, wherein said optical element is embodied in such a way that an angle of divergence $\delta$ of said partially-divergent lightbeam reflected by said scanning mirror in a direction of said scanned spatial area is greater than a maximal angular distance of adjacent scanning tracks in said scanned spatial area.

13. The position measuring arrangement in accordance with claim 1, wherein said light source is embodied as a semiconductor laser, and said partially-divergent lightbeam is generated by said light source without further optical elements being arranged in front of said light source.

14. The position measuring arrangement in accordance with claim 1, further comprising an optical element and a diaphragm that are arranged in said reference arm, which are embodied in such a way that a wave front curvature of said lightbeams reaching detector elements of said opto-electronic detector unit from said reference arm are matched to a wave front curvature of said lightbeams from said measuring arm reaching said detector elements of said opto-electronic detector unit.

* * * * *